(12) United States Patent
Murdock, IV et al.

(10) Patent No.: US 12,301,530 B2
(45) Date of Patent: May 13, 2025

(54) GENERATING ALERTS ON DEMAND FOR PARTICIPANTS IN MULTIPARTY DISCUSSION CHANNELS

(71) Applicant: INTERNATIONAL BUSINESS MACHINES CORPORATION, Armonk, NY (US)

(72) Inventors: James William Murdock, IV, Amawalk, NY (US); Radha Mohan De, Howrah (IN); Jaymin Desai, Jersey City, NJ (US); Suman Patra, Kolkata (IN); Sujoy Roy, Kolkata (IN); Mary Diane Swift, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/933,547

(22) Filed: Sep. 20, 2022

(65) Prior Publication Data

US 2024/0098055 A1    Mar. 21, 2024

(51) Int. Cl.
*H04L 51/224*     (2022.01)
*G06F 40/40*      (2020.01)
*H04L 12/18*      (2006.01)
*H04L 51/216*     (2022.01)

(52) U.S. Cl.
CPC ............ *H04L 51/224* (2022.05); *G06F 40/40* (2020.01); *H04L 12/1831* (2013.01); *H04L 51/216* (2022.05)

(58) Field of Classification Search
CPC . H04L 51/224; H04L 51/216; H04L 12/1831; G06F 40/40
See application file for complete search history.

(56) References Cited

U.S. PATENT DOCUMENTS

| 8,295,462 | B2 | 10/2012 | Miller et al. |
| 9,800,422 | B2 | 10/2017 | Kozloski et al. |
| 10,346,459 | B1 * | 7/2019 | Khanna ............... G06Q 10/103 |

(Continued)

FOREIGN PATENT DOCUMENTS

WO    2016009321    1/2016

OTHER PUBLICATIONS

Alexander, "Sending Notifications Without Conversation Content," Internet.com, [accessed on Aug. 11, 2022], 2 pgs., Retrieved from the Internet: <https://www.intercom.com/help/en/articles/3527623-sending-notifications-without-conversation-content>.

(Continued)

*Primary Examiner* — Christopher B Robinson
*Assistant Examiner* — Angela Widhalm de Rodriguez
(74) *Attorney, Agent, or Firm* — Andre Adkins

(57) ABSTRACT

Techniques are described with respect to a system, method, and computer product for generating relevance alerts. An associated method includes analyzing a multi-party discussion based on a generated profile associated with a user and assigning at least one relevance value associated with the user to the multi-party discussion based on the analysis and an amount of multi-party discussion participation associated with the user. The method further includes generating an alert for the user to participate in the multi-party discussion in response to determining the relevance value exceeding a relevance threshold associated with the multi-party discussion.

20 Claims, 9 Drawing Sheets

(56) References Cited

U.S. PATENT DOCUMENTS

| | | | |
|---|---|---|---|
| 11,055,515 B2 | 7/2021 | Ciano et al. | |
| 11,809,829 B2* | 11/2023 | Miller | G06Q 10/06 |
| 2018/0013764 A1* | 1/2018 | Morrison | H04L 12/1818 |
| 2018/0054320 A1* | 2/2018 | Harpur | H04L 51/04 |
| 2020/0403817 A1* | 12/2020 | Daredia | G06F 16/438 |
| 2021/0058264 A1* | 2/2021 | Fahrendorff | H04L 12/1822 |
| 2021/0399911 A1* | 12/2021 | Jorasch | H04L 12/1822 |

OTHER PUBLICATIONS

Anonymous, "Method and Mechanism for Multiple Simultaneous Participation by Persona Definition in a Web Conference System", IP.com Prior Art Database Technical Disclosure, IP.com No. IPCOM000267440D, Oct. 28, 2021, 5 pgs.

Anonymous, "Method and Mechanism for Multiple Simultaneous Participation by Persona Definition in a Web Conference System," IP.com Prior Art Database Technical Disclosure, IP.com No. IPCOM000256615D, Dec. 14, 2018, 6 pgs.

Anonymous, "Simultaneous Classifying Field of View of the User in Multiple Segments to Attend Multiple Virtual Reality Meetings", IP.com Prior Art Database Technical Disclosure, IP.com No. IPCOM000268364D, Jan. 26, 2022, 5 pgs.

Datapine.com, "The Most Efficient Way to Monitor Your Data," Datapine.com, [accessed on Aug. 11, 2022], 7 pgs., Retrieved from the Internet: <https://www.datapine.com/business-intelligence-data-alerts>.

Google.com, "Alerts, Monitor the Web for Interesting New Content," Google.com, [accessed on Aug. 11, 2022], 2 pgs., Retrieved from the Internet: <https://www.google.com/alerts>.

Mell et al., "The NIST Definition of Cloud Computing", National Institute of Standards and Technology, Special Publication 800-145, Sep. 2011, pp. 1-7.

Slack.com, "Configure Your Slack Notifications," Slack.com, [accessed on Aug. 11, 2022], 6 pgs., Retrieved from the Internet: <https://slack.com/help/articles/201355156-Configure-your-Slack-notifications>.

Spyfu.com, "Brilliant Uses for Google Alerts in Your Marketing," Spyfu.com, [accessed on Aug. 11, 2022], 33 pgs., Retrieved from the Internet: <https://www.spyfu.com/blog/use-google-alerts-for-marketing/>.

Wikipedia, "Recommender System," Wikipedia.com, [accessed on Aug. 11, 2022], 22 pgs., Retrieved from the Internet: <https://en.wikipedia.org/wiki/Recommender_system>.

* cited by examiner

GENERATING ALERTS ON DEMAND FOR PARTICIPANTS IN MULTIPARTY DISCUSSION CHANNELS

BACKGROUND

The present invention relates generally to telecommunication systems, and more specifically, to generating alerts for participants in telecommunication systems.

The use of telecommunication systems, in particular teleconference and videoconference systems, has become a primary mechanism for virtual communications by allowing multiple parties to exchange information in real-time. However, in instances in which an individual is involved in concurrent multi-party discussions across a plurality of channels requiring the individual to shift between conversations in a quick fashion, it is easy for the individual to miss dialogue in respective multi-party discussions where their contribution is warranted or required.

SUMMARY

Additional aspects and/or advantages will be set forth in part in the description which follows and, in part, will be apparent from the description, or may be learned by practice of the invention.

A system, method, and computer product for generating relevance alerts is disclosed herein. In some embodiments, a computer-implemented method for generating relevance alerts includes analyzing, by a computing device, a multi-party discussion based on a generated profile associated with a user; assigning, by the computing device, at least one relevance value associated with the user to the multi-party discussion based on the analysis and an amount of multi-party discussion participation associated with the user; and in response to determining that the relevance value exceeds a relevance threshold associated with the multi-party discussion, generating, by the computing device, an alert for the user to participate in the multi-party discussion.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
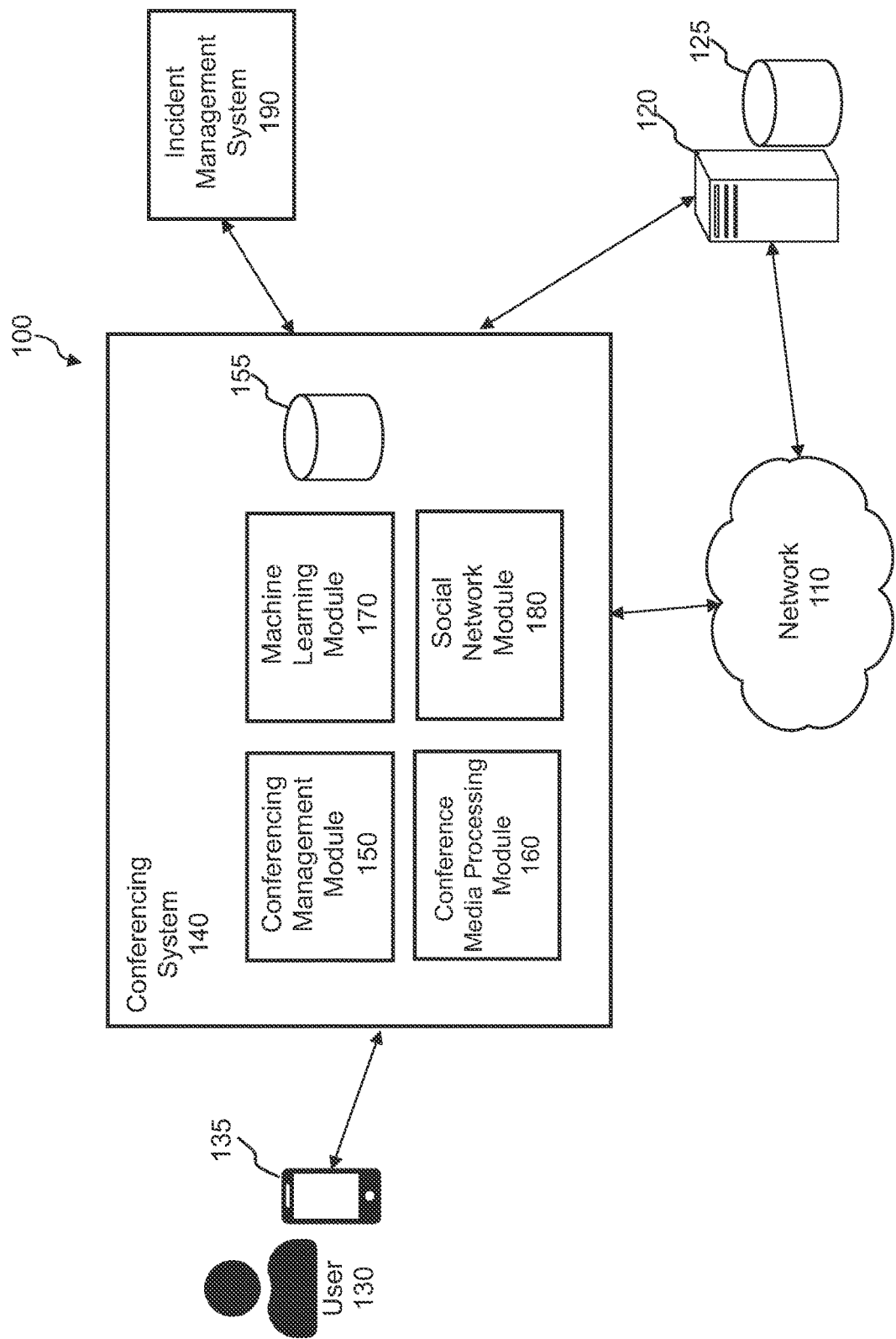
FIG. 1 illustrates an exemplary network diagram depicting a network environment, according to an exemplary embodiment.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for generating relevance alerts. Due to the fast paced environment of multi-party discussions and reliance on telecommunication systems to provide them, it is difficult for an individual to manage communications. For example, a person working on multiple projects simultaneously may not be able to efficiently provide significant contributions to multiple multi-party discussions occurring concurrently because they are lost in the conversation across discussions or they lost interest because a current discussion pertains to an irrelevant matter. Such an inefficiency may result in loss of user contribution to multi-party discussions, and valuable time lost in terms of full attention to relevant matters, collaboration opportunities, delayed work product, etc. It would be helpful to have optimization of discussion analysis and other elements of multi-party discussions in order to remedy the aforementioned issues of efficiency associated with telecommunication systems. The present embodiments have the capacity to analyze multi-party discussions and ascertain relevant points of the multi-party discussions by applying artificial intelligence and machine learning technologies. The application of these technologies not only optimize the process of converting the multi-party discussions into transcripts, but also the process of ascertaining the points of relevance of the discussions that are specific to a user in order to generate alerts to the user when their participation in a discussion is warranted or required. Additionally, some embodiments provide generation of a user-specific profile that supports detection of dialogue topics, analyses, and metrics associated with the user and their interactions with the applicable telecommunication systems to optimize detection of the points of relevance.

FIG. 1 shows a network environment 100 for a telecommunication system, according to an exemplary embodiment. Environment 100 includes a server 120 communicatively coupled to a server database 125, a user 130 associated with a computing device 135, a conferencing system 140 including a conferencing management module 150 configured to facilitate channels of communication, a user profile corpus 155 which may store user profiles for various device users such as user 130, a conference media processing module 160, a machine learning module 170, a social network module 180, and an incident management system 190, each of which are communicatively coupled over network 110. FIG. 1 provides only an illustration of implementation and does not imply any limitations regarding the environments in which different embodiments may be implemented. Modifications to environment 100 may be made by those skilled in the art without departing from the scope of the invention as recited by the claims. Environment 100 is a network of computers in which the illustrative embodiments may be implemented, and network 110 is the medium used to provide communications links between various devices and computers connected together within environment 100. Network 110 may include connections, such as wire, wireless communication links, or fiber optic cables. Network 110 may be embodied as a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network. It should be appreciated that FIG. 1 provides only an illustration of one implementation and does not imply any limitations with regard to the environments in which different embodiments may be implemented. Many modifications to the depicted environments may be made based on design and implementation requirements. For example, conferencing management module 150, user profile corpus 155, conference media processing module 160, machine learning module 170, and social network module 180 may be associated with software and/or hardware components of server 120. Computing device 135 may include, without limitation, smartphones, tablet computers, laptop computers, desktop computers, wearable device, computer-mediated reality (CMR) devices/virtual reality devices, and/or other applicable hardware/software configure to support telecommunication applications. Although only one computing device 135 is shown, in implementations, more computing devices can be in communication with the system shown over network 110. Various embodiments are envisioned without departing from the scope of the invention. Computing device 135 is configured for receiving one or more relevance alerts in which a relevance alert is a notification that notifies user 130 that their involvement in the applicable dialogue of the applicable multi-party discussion is warranted or required at a current or upcoming time. In various embodiments of the invention, a "relevance alert" (or "alert" as used herein), refers to, by non-limiting example, a pop-up window, automatically generated chat window, SMS notification, e-mail, audible sound, etc. which serves to alert the user 130.

Conferencing management module 150 allows user 130 to configure elements of conferencing system 140 according to user preferences via a centralized platform generated by server 120, which is designed to be accessed on computing device 135. Conferencing system 140 may be any applicable conferencing service or collection of conferencing services configured to provide telecommunication functionality that allows users to conference with each other virtually. Examples of conferencing system 140 include any other type of telecommunication system providing communication modalities for one or more of text chat, voice chat, videoconferencing, document sharing, screen sharing, etc. As described herein, discussions may include but are not limited to dialogue received by conferencing system 140 in the form of text, audio, multi-media, combinations thereof, or any applicable input configured to be received by multi-party telecommunication channels. The centralized platform may host multi-party discussions integrating the channels that allow participants to converse and exchange data with each other in real-time, in which analytics, metrics, etc. pertaining to participant dialogues and other applicable data conferencing system 140 (e.g., length of discussions, frequency of one or more topics addressed, etc.). Embodiments of conferencing system 140 provide configurations to support live-meetings in virtual venues as well as non-virtual venues, such as a conference room including audiovisual equipment to monitor participants in a multi-party discussion. The audiovisual equipment may be standalone, networked products, or may be webcams and sensors (e.g., cameras, microphones, etc.) from computing devices of participants in the conference room. In some embodiments, conferencing system 140 includes a telephony system such as POTS, PBX, VoIP, or other suitable type of telephony service known to those of ordinary skill in the art. Inclusion of the telephony system allows conferencing system 140 to access multi-party discussions via telephone devices if applicable in which the content of the multi-party discussions are captured via sensors of computing device 135.

In addition, conferencing management module 150 not only facilitates the multi-party discussions (e.g., meetings, conferences, etc.), calendars, messaging, and media content management of conferencing system 140, but also management of application program interfaces configured to interact with conferencing system 140 and other applicable plugins. Items of conferencing system 140 such as call logs, visualizations of multi-party discussion analytics, presentation slides (e.g., via PowerPoint®), text documents (e.g., via Word® documents), spreadsheets/charts, text messages, or images, etc. are stored in database 125.

Conferencing media processing module 160 performs analyses of multi-party discussions data and data derived from user profile corpus 155 and utilizes machine learning module 170 in order to support functionality including but not limited natural language processing in order to convert the audio of the multi-party discussions into transcripts along with assisting with the analysis of text within the transcripts. In various embodiments of the invention, an image analysis may be alternatively or performed in addition. Optical character recognition ("OCR") techniques may be applied to the transcripts in order to assist with detection of words and/or phrases of importance and relevance within the dialogues of the multi-party discussions.

Machine learning module 170 is configured to use one or more heuristics and/or machine learning models for performing one or more of the various aspects as described herein (including, in various embodiments, the natural language processing or image analysis discussed herein). In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure.

In some embodiments, machine learning module 170 utilizes one or more machine learning models to perform image analyses on applicable images utilized during multi-party discussions (e.g., transmitted images among participants during discussions, content of slides/presentations, etc.). The image analyses allow content relevant to topics, subjects, etc. discussed during the multi-party discussions to be identified and tagged with applicable metadata indicating specifics relating to the content such as, but not limited to topic, relevance, time data, data source of images, etc. In addition, machine learning module 170 being able to perform analyses on images associated with multi-party discussions allows conferencing system 140 to ascertain whether the image, collection of images, etc. are relevant to user 130. For example, an analysis of an image depicted within a presentation presented within a multi-party discussion allows conferencing system 140 to determine the topic associated with the analyzed image in order to determine if the applicable associate portion of the presentation is relevant to user 130 and requires their involvement/participation.

Social network module 180 facilitates linking of social media accounts associated with user 130 upon consent obtained from user 130, consent from user 130 indicating approval. Social media data may be derived from the social media accounts such as posts, interests, likes, comment-based reactions, or any other applicable social media based data sources known to those of ordinary skill in the art. The social media accounts may be from any applicable social media platform presently existing or after-arising.

Incident management system 190 is configured to describe problems and solutions of user 130 in addition to ascertain analytics associated with user 130 and conferencing system 140 including, but not limited to history of user activity within the multi-party discussions, patterns of interactions within the multi-party discussions, topics of dialogues that user 130 consistently engages in, other users within the multi-party discussions that frequently interact with user 130, etc. For example, incident tickets derived from incident management system 190 pertaining to problems and solutions of user 130 (e.g., system faults, browser issues, etc.) are analyzed in order for machine learning module 170 utilize the one or more machine learning models to generate predictions pertaining to problems and solutions associated with user 130 that relate to identified topics within the transcripts.

User profile corpus 155 is a collection of data associated with user 130 continuously being sourced from the modules of environment 100. Data associated with user 130 may be made available to user profile corpus 155 in various ways, including web crawling, database access, etc. Data included within user profile corpus 155 includes derivatives of data sources available in various ways, including but not limited to social media profiles, social media activity, problems/solutions of incident management system 190, activities of user 130 within a project management system, publications, blogs, technical reports, patent applications, user activity within conferencing system 140, any other applicable ascertainable data associated with user 130. Historic data associated with actions, studies, interests, work assignments, etc. of user 130 are loaded into user profile corpus 155 from data that exists in various repositories and other data sources traversed by the crawlers (as discussed above). As machine learning module 170 iterates over time, historic data can be updated to include data that server 120 collects from the crawlers, user information, and user preferential data. User information may account for data existing in enterprise and other applicable repositories including but not limited to email archives, support records, issue tickets, comments/notes/insights of user 130, calendar information, etc. For instance, machine learning module 170 may weight the knowledge level of user 130 in a given conferencing or textual exchange within conferencing system 140 higher or lower based on their area of expertise/research, response rate to certain topics, magnitude of input on a topic, etc. User preferential data includes data that can be inputted by the user via interfaces provided by the centralized platform such as preferred paths of communication, threshold parameters, preferred lead time, etc. The data collected in user profile corpus 155 can be used to train the machine learning models by a topical analysis, by breaking down dialogues based on topic, or by a neural network machine learning and creating a feedback loop based on best results. In the feedback loop, system output can be used as input to guide future operation. The results of running machine learning module 170 may be recorded to predict best outcomes of future iterations. Utilizing topic identification, sentiment analysis, and multiple factors recorded in user profile corpus 155 and server database 125 if applicable, the machine learning module 170 will be able to predict which path, textual and/or conferenced communication, would result in the least time for issue resolution. The factors identified by textual analysis are weighted to assist in the running of models. Factor weights can be assigned initial conditions and can be updated as the models are trained and used in prediction. For instance, if user 130 resolves issues quicker for certain subject matters than others or resolves issues quicker for certain subject matter over a certain communication path over time, machine learning module 170 will weight this subject matter and/or method of communication higher when making its prediction.

It should be noted that data derived from user profile corpus 155 is utilized by server 120 to generate a user profile associated with user 130. The user profile may be utilized by conferencing media processing module 160 to ascertain the criteria for generating a plurality of relevance values associated with user 130 assigned to time intervals of the multi-party discussions. In some embodiments, the plurality of relevance values are generated in reference to a relevance threshold of the multi-party discussion. If a relevance value at a time interval exceeds the relevance threshold then instructions to generate and transmit a relevance alert are triggered.

Figure 2:
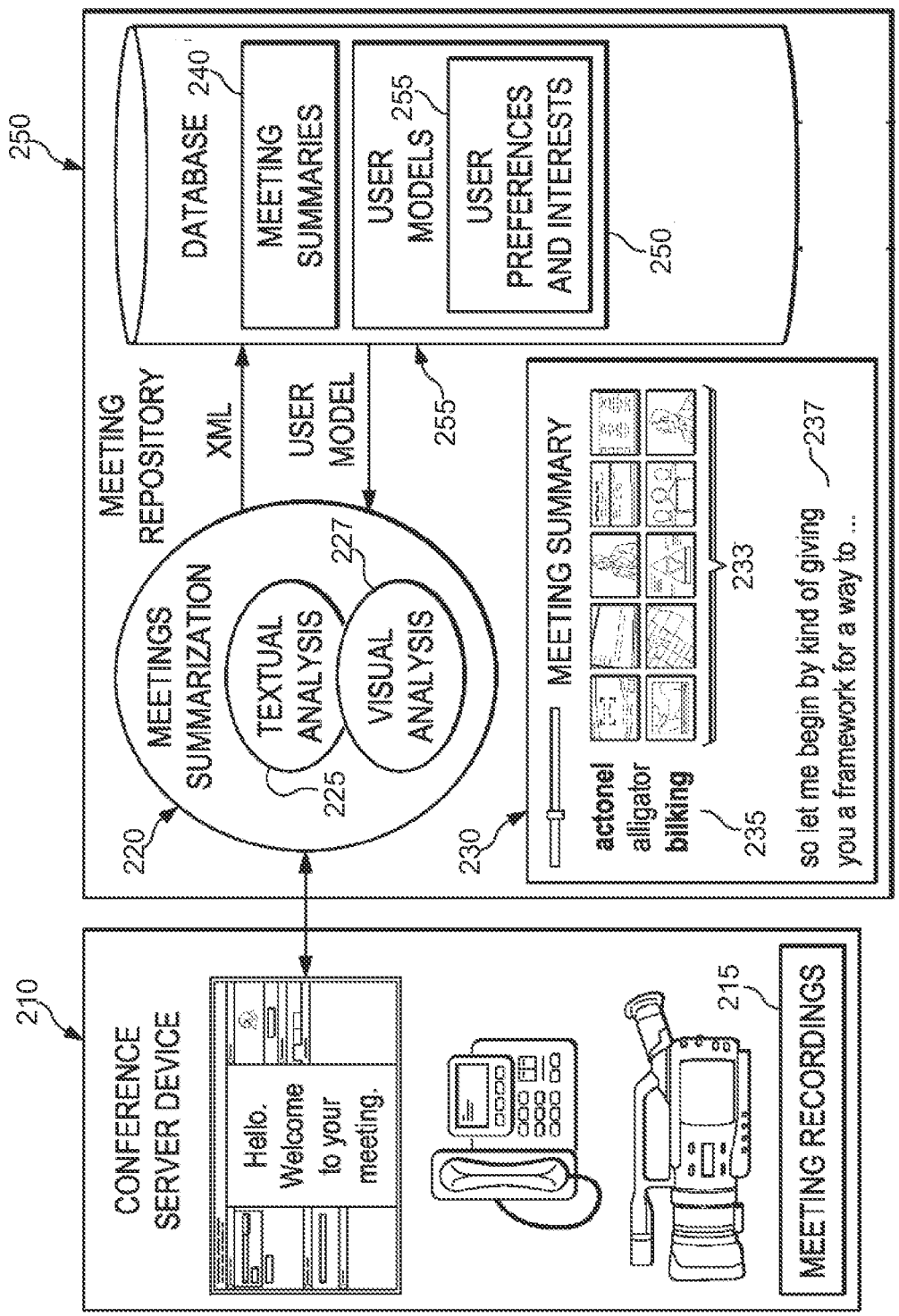
FIG. 2 illustrates an exemplary conferencing management module of a conferencing system shown in the network environment of FIG. 1, according to an exemplary embodiment.

Referring now to FIG. 2, conferencing management module 150 is depicted, according to an exemplary embodiment. Conferencing management module 150 includes a conference server device 210 configured to manage multi-party discussions. Managing by conferencing management module 150 may include processing and analyzing the multi-party discussions in real-time by monitoring participant dialogues of the multi-party discussions for participant dialogue topics that are relevant to user 130. In particular, conferencing management module 150 may monitor multi-party discussions involving user 130 by acting as a virtual participant within the multi-party discussions in order to access audio, video, text, etc. content of the multi-party discussions for transmission to conference media processing module 160. In some embodiments, conferencing management module 150 monitors the amount that user 130 participates in current and previous multi-party discussions in which the amount of participation may be a factor weighed into the determination as to whether a portion of a multi-party discussion dialogue is relevant to user 130.

Conferencing management module 150 includes telephonic-based communications and/or computer-based communications using either or both wireless and wired connections. Conferencing management module 150 captures the contents of multi-party discussions as records and then stores the records of the multi-party discussions in multi-party discussions records 215, in which the multi-party discussions may be occurring simultaneously. In some embodiments, as conferencing management module 150 is capturing the multi-party discussions, machine learning module 170 is performing speech to text transcribing of the dialogues of multi-party discussions in which words, phrases, sentences, etc. are identified and parsed from the audio feeds of the dialogues for conversion into text transcripts.

Conferencing management module 150 utilizes conference media processing module 160 to generate meeting summarizations 220 of the multi-party discussions; however, meeting summarizations 220 may be transcripts of recorded content within dialogues of the multi-party discussions derived from the monitoring process. Meeting summarizations 220 may include textual analysis 225 which is a textual manifestation of the natural language processing (NLP) performed by machine learning module 170 on the dialogues of the multi-party discussions in order to identify a plurality of participant dialogue topics within the respective multi-party discussion dialogues. Textual analysis 225 may further include machine learning module 170 performing the tasks of: 1) automatic summarization, which produces a readable summary of a chunk of text; 2) named entity recognition, which determines which items within a chunk of text are proper names, such as people, places, topics, entities, etc.; 3) relationship extraction, which identifies relationships among named entities within a chunk of text; 4) topic segmentation and recognition, which separates chunks of text into segments, each of which belongs to a topic, and identifies the topic of the segment; and any other applicable NLP functions known to those of ordinary skill in the art. Meeting summarizations 220 further includes visual analysis 227 which is a result of conference server device 210 ascertaining media within the multi-party discussions (e.g., recorded video, shared documents, presentations, etc.) and machine learning module 170 correlating and clustering the media with topics relevant to dialogues of the respective multi-party discussions. For example, machine learning module 170 presents a visual presentation of artificial intelligence mapping during a multi-party discussion to the topic of artificial intelligence and to the applicable presenter speaking during the time period of the dialogue in which the presentation is depicted.

Meeting summarizations 220 further include analytics 233, 235, and 237 pertaining to textual analysis 225 and visual analysis 227. For example, analytics 233 may be a first list including identified topics discussed within the dialogues of the multi-party discussions, analytics 235 may be a second list of entities identified within the dialogues of the multi-party discussions speaking regarding the identified topics, and analytics 237 may be a third list of correlations between identified participant dialogue topics discussed within the multi-party discussions and a plurality of profile topics derived from user profile corpus 155. Analytics 233, 235, and 237 may be transmitted to computing device 135 as an extensible markup language (XML) format or any other applicable data format.

It should be noted that a user model 250 representing a user profile for each user of conferencing system 140 is generated based on data derived from user profile corpus 155. User preferences and interests 255 reflected in the user profile are utilized as a reference point for determining the plurality of profile topics relevant to user 130, and the participant dialogue topics are compared to the plurality of profile topics; however, user 130 may also designate profile topics via inputs on user interfaces provided by the centralized platform. Topics which are relevant to user 130 are established by data ascertained from the user profile and server 120. In some instances machine learning module 170 generates one or more predictions including whether a topic is a profile topic and/or whether that user 130 is a subject matter expert in the topic. The one or more machine learning models may utilize data derived from user profile corpus 155 and server 120 as training data sets. For example, the combination of social media activity derived from social network module 180 (e.g., comments, liked articles, etc.), historical activity patterns of user 130 on conferencing system 140 (e.g., topics associated with previous multi-party discussions user 130 has significantly contributed towards), and internet browsing activity allows machine learning module 170 to predict that user 130 is a subject matter expert in artificial intelligence, which is indicated in the generated user profile. Based on the aforementioned, conference management module 150 instructs conference media processing module 160 to monitor the multi-party discussions to identify moments in each respective dialogue in which the topic of artificial intelligence is of subject. Conferencing management module 150 is further configured to generate user multi-party discussion summaries 240 which are variations of meeting summarizations 220 generated based on user model 250 reflecting user preferences and interests 255. In some embodiments, user multi-party discussion summaries 240 are interactive visual representations of transcripts including dialogue specific timelines tagged with a plurality of visual markers indicating time points in the dialogues in which the dialogue topics are referenced along with a correlation rate between the dialogue topics and profile topics if applicable.

Figure 3:
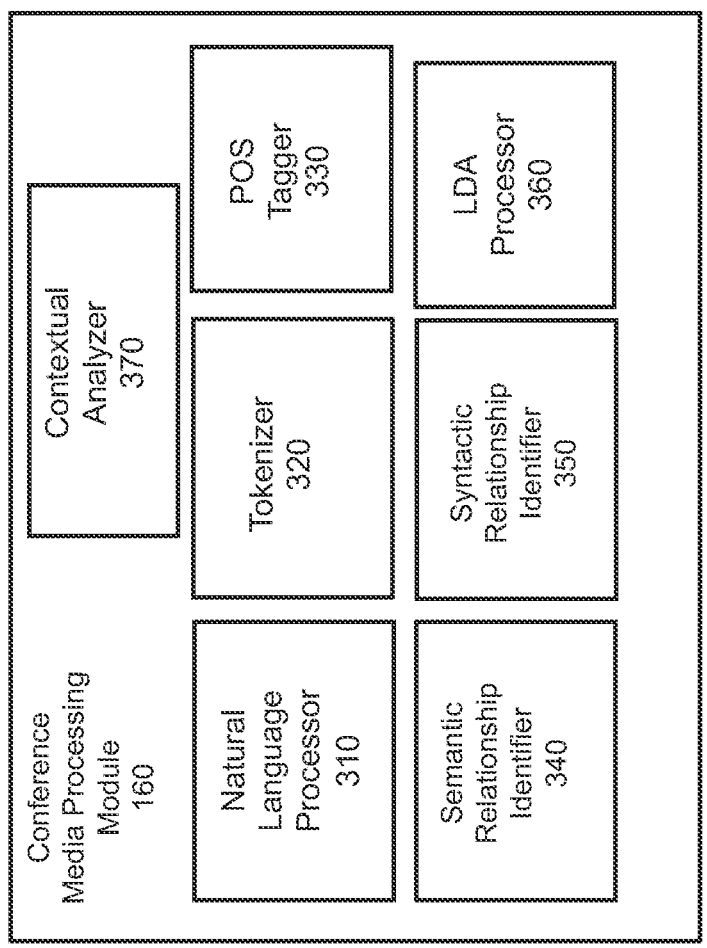
FIG. 3 illustrates an exemplary conference media processing module of the conferencing system shown in FIG. 1, according to an exemplary embodiment.

Referring now to FIG. 3, conference media processing module 160 is depicted, according to an exemplary embodiment. Conference media processing module 160 includes a tokenizer 320 configured to perform lexical analysis, a part-of-speech (POS) tagger 330 configured to mark up a word in the transcript to correspond to a particular part of speech, a semantic relationship identifier 340 configured to identify semantic relationships of recognized topics and multi-party discussion elements (e.g., words, phrases, videos, images, files, etc.) in the contextual activity, and a syntactic relationship identifier 350 configured to determine the grammatical structure of sentences within the multi-party discussions. Conference media processing module 160 further includes a Latent Dirichlet Allocation (LDA) processor 360 configured to identify contextual situations from contextual activity and perform topic modeling of the multi-party discussions, and a contextual analyzer 370 configured to ascertain sentiment, expression, action strategy, question answering, etc. within the dialogues of the multi-party discussions. Each of the aforementioned components of conference media processing module 160 are communicatively coupled to machine learning module 170.

The POS tagger 330 may read portions of transcripts or other text within files of multi-party discussions (e.g., messages, power-points, etc.) in natural language and assign a part of speech to each word or other token in addition to determine the part of speech to which a word corresponds based on the definition of the word and the context of the word as it is used in the multi-party discussion. The context of a word may be based on its relationship with adjacent and related words in a phrase, sentence, or file of a multi-party discussion. In some embodiments, the context of a word may be dependent on one or more previously analyzed contextual activities (e.g., the contextual activity of a past multi-party discussion may shed light on the meaning of one or more possible contextual situations in another multi-party discussion). The semantic relationship identifier 340 may determine functional dependencies between entities and other semantic relationships within the multi-party discussions. The speech to text conversion process is one of various ways in which conference media processing module 160 may ascertain the transcripts of the multi-party discussions in order for conference media processing module 160 to perform the aforementioned functions on said transcripts.

In some embodiments, the transcripts may be depicted via visual representations having time intervals. Based on the analyses performed by conference media processing module 160, parsed excerpts of the multi-party discussions are ascertained and indicated within the time intervals. The excerpts are ascertained by machine learning module 170 utilizing one or more binary classifiers configured to receive feature sets derived from the transcripts in order to classify segments of the transcripts as relevant to user 130. In some embodiments, the binary classifiers utilize the aforementioned feature sets in addition to data derived from one or more of the user profile, server 120, conferencing management module 150, and user profile corpus 155 to generate the classifications. For example during the monitoring of dialogues of the multi-party discussions, contextual analyzer 370 ascertains that the context of one of the dialogues pertains to a problem associated with optimizing a machine learning model along with a sentiment or expression from that dialogue that a difficult question regarding the problem has been presented. Conference media processing module 160 previously ascertaining from the user profile that user 130 is a specialized data scientist, tags the applicable parsed segment of the transcript relating to the dialogue as relevant to user 130 and marks the applicable time interval accordingly. In some embodiments, prompts may be presented to computing device 135 via the centralized platform soliciting from user 130 whether or not the tagged segment of the transcript is relevant to user 130 and further asking if involvement of user 130 is necessary or desired. The parsed segment may be analyzed and stored in server database 125 for future iterations of machine learning module 170 in order to facilitate quicker detection of excerpts of transcripts relevant to user 130. The excerpts may be presented to user 130 via the centralized platform in which the excerpts include the relevant time intervals and applicable metadata, analytics, etc. indicating correlations between components of the excerpts and data derived from the user profile.

LDA processor 360 performs topic modeling of the multi-party discussions which allows the organization of the transcripts based on their topics, which may be presented in a chronological order based on the time intervals. LDA processor 360 may perform this by utilizing a naïve bayes unigram model, a maximum entropy model, a latent semantic model or any other such technique that is known in the art or developed in the future. LDA processor 360 is further configured to support usage of bigrams, trigrams, or more generally, n-grams (number=n) for transcript analysis, and apply one or more topic models to the transcripts resulting in outputting of one or more corresponding relevance values that provide an indication of a degree of relevance to which a given subject or time interval is relevant to user 130 based upon the user profile. In addition, LDA processor 360 is designed to generate one or more corresponding topic scores that provide an indication of a degree to which a given topic is being discussed in the multi-party discussion. For example based on the analysis of a transcript, LDA processor 360 may output a score of "0.2" for "Debugging," a score of "5.7" for "Computing Resource Allocation" and a score of "9.4" for "Machine Learning Model Optimization," which may indicate that the dialogue is primarily about "Machine Learning Model Optimization" but "Computing Resource Allocation" is also somewhat being discussed and "Debugging" is not being discussed much at all. Additionally, assignment of the relevance scores may factor the amount of participation of user 130 in current and/or previous multi-party discussion dialogues to increase the accuracy of detected time intervals including relevant dialogue. For example, if the history indicates that user 130 has a significant amount of participation in multi-party discussion dialogues involving particular users, topics, files, etc., then a higher relevance score is assigned to the applicable time interval pertaining to the relevant dialogue.

In some embodiments, machine learning module 170 generates outputs which serve as predictions of which time intervals of the transcripts LDA processor 360 assigns the relevance values. A plurality of factors may be taken into account in order to determine which time interval receives a relevance value including, but not limited to detected keywords during dialogues of a multi-party discussions, detection of a pause in dialogue/activity of a multi-party discussion, dialogue participation history of user 130, detected mentioning of the name or interests/specialty/research of user 130, presentation of media content relating to interests of user 130, or any other applicable factor configured to be derived from data processed by server 120 or conferencing system 140. In some embodiments, the relevance value is based on LDA processor 360 analyzing a level of active user participation of user 130 in the participant dialogue of the current multi-party discussion which is weighed in light of data derived from the user profile, activity patterns of the user, and a previous involvement of the user in dialogues of the multi-party discussions.

Machine learning module 170 further generates the relevance threshold for each multi-party discussion based on the processing or data derived from said processing performed by conference media processing module 160. For example, ascertained topics relevant to user 130 based on the user profile in addition to topics ascertained from the topic models of each multi-party discussion are training data sources used in order to generate the relevance thresholds because the relevance threshold being exceeded by the relevance values indicates the applicable topic at the assigned time interval is of relevance to user 130.

Figure 4:
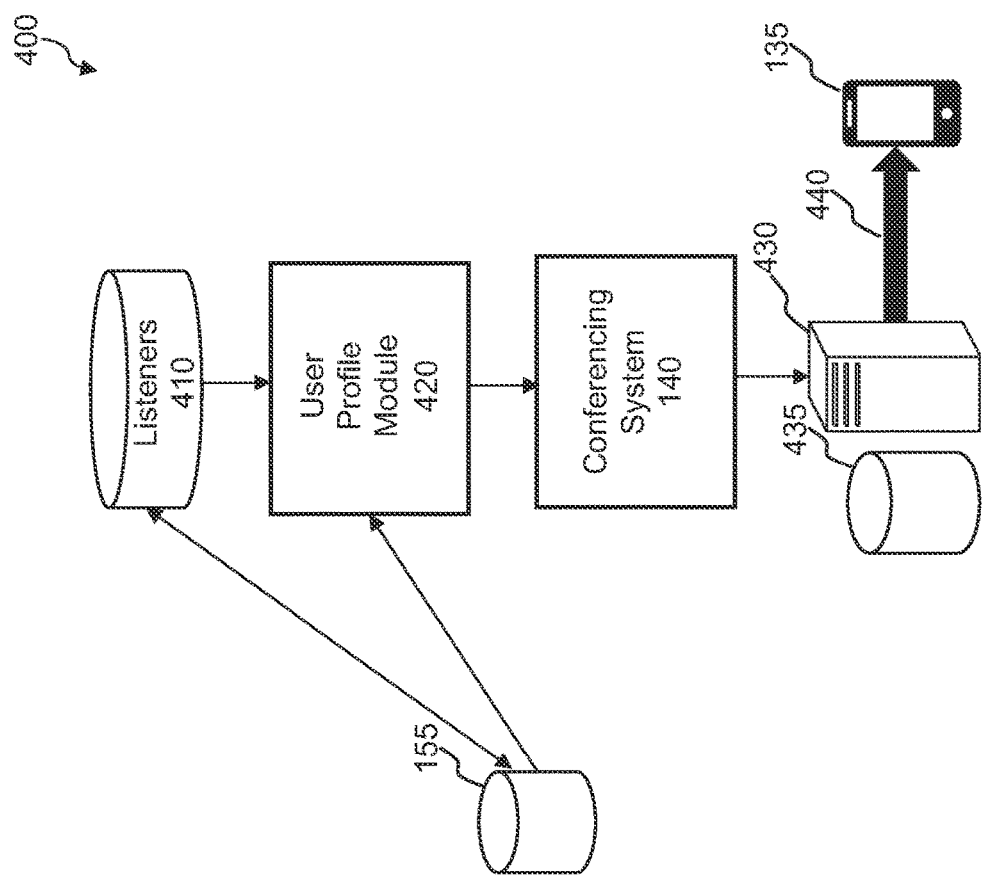
FIG. 4 illustrates a system for generating relevance alerts, according to at least one embodiment.

Referring now to FIG. 4, a system for generating relevance alerts 400 is depicted, according to an exemplary embodiment. System 400 includes listeners 410, a user profile module 420, a notification server 430 (communicatively coupled to and associated with server 120), and a notification database 435 communicatively coupled to notification server 430. System 400 is configured to handle administering notifications, such as relevance alerts, in response to the relevance values exceeding the relevance thresholds. However, system 400 also ensures that new and/or updated data pertaining to user 130 is provided to user profile corpus 155 in order to ensure that conferencing system 140 is continuously optimizing detection of topics relevant to user 130 and instances in which involvement of user 130 in a dialogue of a multi-party discussion is recommended or necessary. Listeners 410 are configured to listen for utterance of words, phrases, sentiments, etc. during the dialogues of the multi-party discussions associated with topics that may be relevant to user 130. In addition, listeners 410 may further serve as web crawlers configured to traverse internet data sources for information associated with user 130 that needs to be added to user profile corpus 155. In some embodiments, listeners 410 are further designed to monitor the amount of participation of user 130 during dialogues for the purpose of assisting conferencing system 140 with assigning the relevance values based on the amount of participation.

User profile corpus 155 is communicatively coupled to user profile module 420 which is tasked with generating and managing the user profile based on data derived from user profile corpus 155. In some embodiments, content of the user profile may be modified by user 130 via user interfaces provided by the centralized platform. User profile module 420 may further specify within the user profile the preferred method by user 130 to receive the relevance alerts from notification server 430. For example in the instance where computing device 135 is a wearable device or communicatively coupled to a wearable device, notification server 430 generates a haptic-based relevance alert and transmits it to the wearable device. Notification server 430 generates a notification queue in which a plurality of relevance alerts 440 relating to multi-party discussions associated with user 130 are stored and transmitted to computing device 135 via transmission methods including but not limited to email, text message, push notification, sound notification, vibrate notification, smart notification, and any other applicable type of notification known to those of ordinary skill in the art. Relevance alerts 440 are indicators or recommendations that user 130 should or needs to interact or participate in the applicable multi-party discussion based on the relevance value exceeding the relevance threshold. In some embodiments, relevance alerts 440 may include a volume or intensity level designated by notification server 430 based on applicable relevance score that exceeds the relevance threshold. For example, if the applicable relevance score slightly exceeds the relevance threshold then relevance alert 440 may be a singular push notification presented to computing device 135 as opposed to if the applicable relevance score greatly exceeds the relevance threshold then relevance alert 440 is a more aggressive notification (e.g., continuous, loud sounds emitted, red colored background, etc.) delivered to computing device 135.

User profile module 420 is designed to generate and update the user profile based upon feedback data received from computing device 135. For example, after generating and transmitting the relevance alert, notification server 430 may solicit feedback from user 130 via the centralized platform in order to determine whether the assignment of a relevance value to the applicable time interval was accurate. The feedback data is received by user profile module 420 and reflected in the user profile for utilization by machine learning module 170 to generate predictions relating to topics in future iterations. User profile module 420 generates and transmits the user profile to conferencing system 140 over network 110 in order for conference media processing module 160 to have a criteria for monitoring dialogues of the multi-party discussions. The comparison of participant dialogue topics derived from the analyses of the multi-party discussion dialogues to the profile topics is based on machine learning module 170 detecting the topics within the dialogues and analyzing context, sentiment, etc. for alignment with the profile topics.

Figure 5:
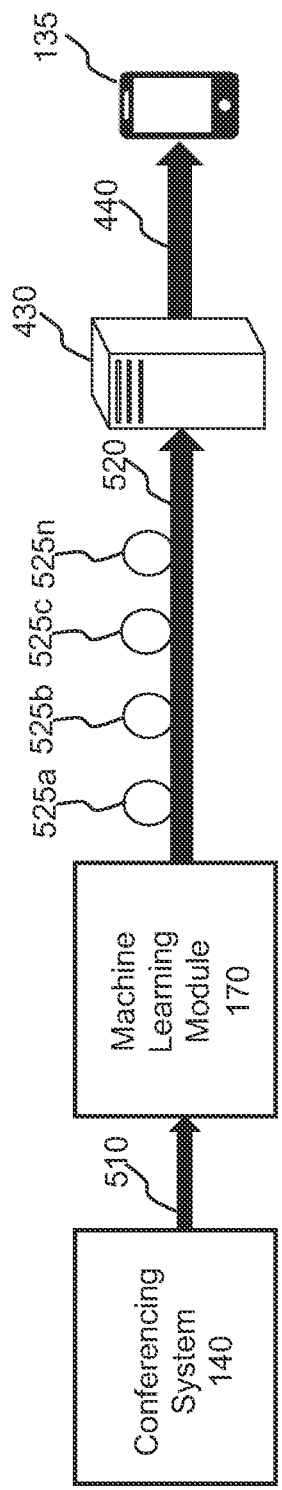
FIG. 5 illustrates an exemplary data flow associated with the conferencing system of the environment of FIG. 1, according to an exemplary embodiment.

Referring now to FIG. 5, a data flow 500 associated with conferencing system 140 assigning relevance values is depicted, according to an exemplary embodiment. Conference server device 210 records content of multi-party discussions resulting in a multi-party discussion content 510 in order for machine learning module 170 to convert content 510 into a transcript 520. In some embodiments, transcript 520 includes a plurality of time intervals configured to be assigned a plurality of relevance values 525a, 525b, 525c, 525n relative to the profile topics ascertained from the user profile. As machine learning module 170 is converting content 510 into transcript 520, conference media processing module 160 is analyzing content 510 and tagging content 510 with metadata indicating timestamps, keyword tags, topic tags, relevance tags, correlation rates (dialogue topics in relation to profile topics), etc. Transcript 520 is configured to include the plurality of time intervals in which one or more of the time intervals are assigned a relevance value based upon the alignment of the topic of the dialogue at the given time interval with the applicable profile topic. For example, a first time interval may be assigned relevance value 525a because the dialogue of a multi-party discussion at the first time interval pertains to machine learning, a second time interval may be assigned relevance value 525b because the dialogue of the multi-party discussion at the second time interval pertains to training data sets, and a third time interval may be assigned relevance value 525c because the dialogue of the multi-party discussion at the third time interval pertains to optimizing machine learning models. Due to a specialization of user 130 being ascertained from the user profile, machine learning module 170 predicts the dialogue at the third time interval pertains to at least one of the profile topics and conferencing media processing module 160 determines that only relevance value 525c exceeds the relevance threshold. Assignment of relevance values 525a, 525b, and 525c is based upon the comparison between the dialogue at the given time interval and the profile topics derived from the user profile, in which the topic scores may be taken into account in order to determine the assignment of the relevance values. In addition, as previously stated the amount of participation of user 130 in current or previously multi-party discussion dialogues may also be weighed in the assignment of relevance values 525a, 525b, and 525c. Assignment of relevance values 525a, 525b, and 525c may also be based upon the allocation of excerpts.

In some embodiments, conference media processing module 160 calculates a lead time for user 130 which is a grace period that accounts for the period of time between when the relevance alert associated with a time interval is transmitted to computing device 135 and the point in the dialogue where participation of user 130 in the dialogue of the applicable multi-party discussion is warranted. For example upon determination that relevance value 525c exceeds the relevance threshold, conference media processing module 160 calculates the lead time based on the time interval relevance value 525c is assigned to and instructs notification server 430 to generate and transmit relevance alert 440 to computing device 135 providing user 130 sufficient time to view relevance alert 440 and participate in the dialogue of the applicable multi-party discussion. The lead time may also be calculated based on activity patterns of user 130 or analytics derived from conferencing system 140.

Figure 6:
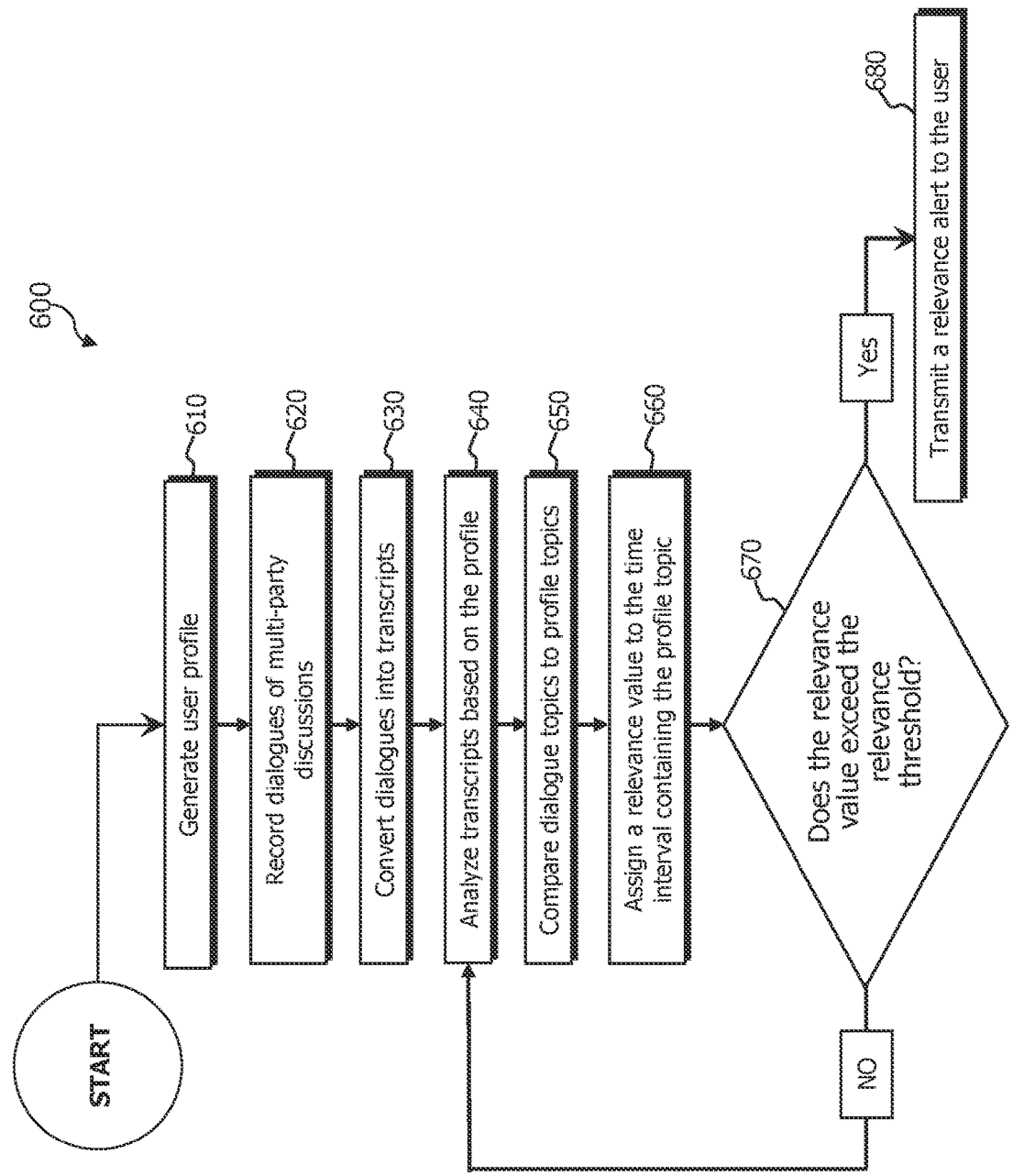
FIG. 6 illustrates a flowchart depicting a method for generating relevance alerts, according to at least one embodiment.

With the foregoing overview of the example architecture, it may be helpful now to consider a high-level discussion of an example process. FIG. 6 depicts a flowchart illustrating a computer-implemented process 600 for generating relevance alerts, consistent with an illustrative embodiment. Process 600 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 610 of process 600, user profile module 420 generates the user profile for user 130 based on data derived from user profile corpus 155. As previously mentioned, user profile corpus 155 is continuously updated with information pertaining to user 130 in addition to data derived from the iterations of machine learning module 170 that optimize outputs relating to the interests, studies, work assignments, social media activity, activity patterns, dialogue participation, and other applicable interactions associated with user 130 that assist with ascertaining topics of relevance for user 130. For example, iterations of machine learning module 170 may ascertain the dynamic between user 130 and other participants in the multi-party discussions (e.g., manager role task assignment, work assignment team cooperation, seminar panelist, etc.) which assists with predictions for when it may be necessary or recommended for user 130 to participate in a multi-party discussion. The ascertained role of user 130 within dynamics with other multi-party discussion participants may be added to user profile corpus 155 to update the user profile.

At step 620 of process 600, conferencing system 140 utilizes conferencing management module 150 to conduct the multi-party discussions and conference media processing module 160 to record the content of the dialogues of the multi-party discussions. Recording of the content allows conference media processing module 160 to monitor the dialogues for identification of multi-party discussion participants and participant dialogue topics based on the respective participant's dialogue. In some embodiments, topic scores are allocated across the identified topics within the dialogues allowing conference media processing module 160 to take the topic scores into consideration when assigning the relevance values during the audio to transcript conversion phase.

At step 630 of process 600, conference media processing module 160 converts the content of the dialogues of the multi-party discussions into transcripts including the plurality of time intervals. In some embodiments, the transcripts are configured to be tagged with various metadata relating to the content of the respective dialogues in which visual markers of the tags at the time intervals may be represented on maps and charts depicted on user interfaces provided by the centralized platform. For example, during the dialogue of a multi-party discussion a participant may provide a presentation file in which the applicable time interval associated with this time period of the dialogue is tagged with metadata that may include, but is not limited to a timestamp, keywords relevant to the presentation and topic, applicable topic scores, etc. The purpose behind this function is to optimize analytics 233, 235, and 237 pertaining to textual analysis 225 and visual analysis 227. User 130 may also adjust and/or confirm the assigned topic scores in order to increase the accuracy of outputs of machine learning module 170 in future iterations.

At step 640 of process 600, conference media processing module 160 analyzes the transcripts of the multi-party discussions based on the user profile. One of the primary purposes of the analyses is to efficiently ascertain the dialogue topics that are occurring within the multi-party discussions concurrently. As dialogue topics are being identified conference media processing module 160 may continuously apply the topic scores in order to ascertain which time intervals may warrant assignment of relevance values. The relevance threshold may be impacted by one or more of user preferences derived from the user profile or inputs on the centralized platform, outputs of machine learning module 170, data processed by conferencing system 140, etc.; however, the relevance threshold is directly correlated and established based on the profile topics derived from the user profile.

At step 650 of process 600, conference media processing module 160 compares the identified dialogue topics to the profile topics of the user profile. In some embodiments, comparing of the dialogue topics to the profile topics is accomplished by mapping the topic scores to identified dialogue topics and subsets of the dialogue topics (e.g., keywords, context-based concepts, semantics, etc.) relative to the profile topics. For example, the profile topics may include the topics of "artificial intelligence" and "training time", and the topic of "edge computing" may be an identified dialogue topic in which artificial intelligence is mentioned briefly. The mapping of the topic scores to identified dialogue topics and subsets of the dialogue topics serves as a filtration mechanism for ascertaining topics relevant to user 130. The filtration through identified dialogue topics allows more efficient detection of profile topics within the dialogues.

At step 660 of process 600, conference media processing module 160 assigns the relevance values to the time intervals of the transcripts including dialogue pertaining to the profile topics. The correlation between the time intervals and the relevance values confirms that the time period associated with the respective time intervals includes dialogue pertaining to the profile topic. In some embodiments, the relevance values may be viewed via the interactive visual transcript representations presented to user 130 on the centralized platform. Time intervals may be ranked based on the relevance scores in which the ranking of the time intervals along with the topic scores may be weighed when conference media processing module 160 is determining whether the relevance scores exceed the relevance threshold.

At step 670 of process 600, conferencing management module 150 determines whether the relevance score at a time interval exceeds the relevance threshold. If the relevance score exceeds the relevance threshold then step 680 of process 600 occurs in which notification server 430 transmits relevance alert 440 to computing device 135 notifying user 130 of a time interval of a multi-party discussion that warrants the involvement of user 130. If the relevance score does not exceed the relevance threshold then conference media processing module 160 continuous to analyze the transcripts based on the user profiles in order to detect dialogue of the multi-party discussions that pertain to the profile topics. In some embodiments, the relevance score is utilized by conferencing management module 150 to determine the volume or intensity level of relevance alert 440. For example, if the relevance score slightly exceeds the relevance threshold then relevance alert 440 may be a less intense push notification (e.g., low vibration emitted with passive lighting triggered) received by computing device 135 as opposed to the relevance score significantly exceeding the relevance threshold resulting in relevance alert 440 including an intense push notification including a blaring ring sound with attention capturing flashing or any other applicable attention grasping mechanisms being emitted from computing device 135.

Figure 7:
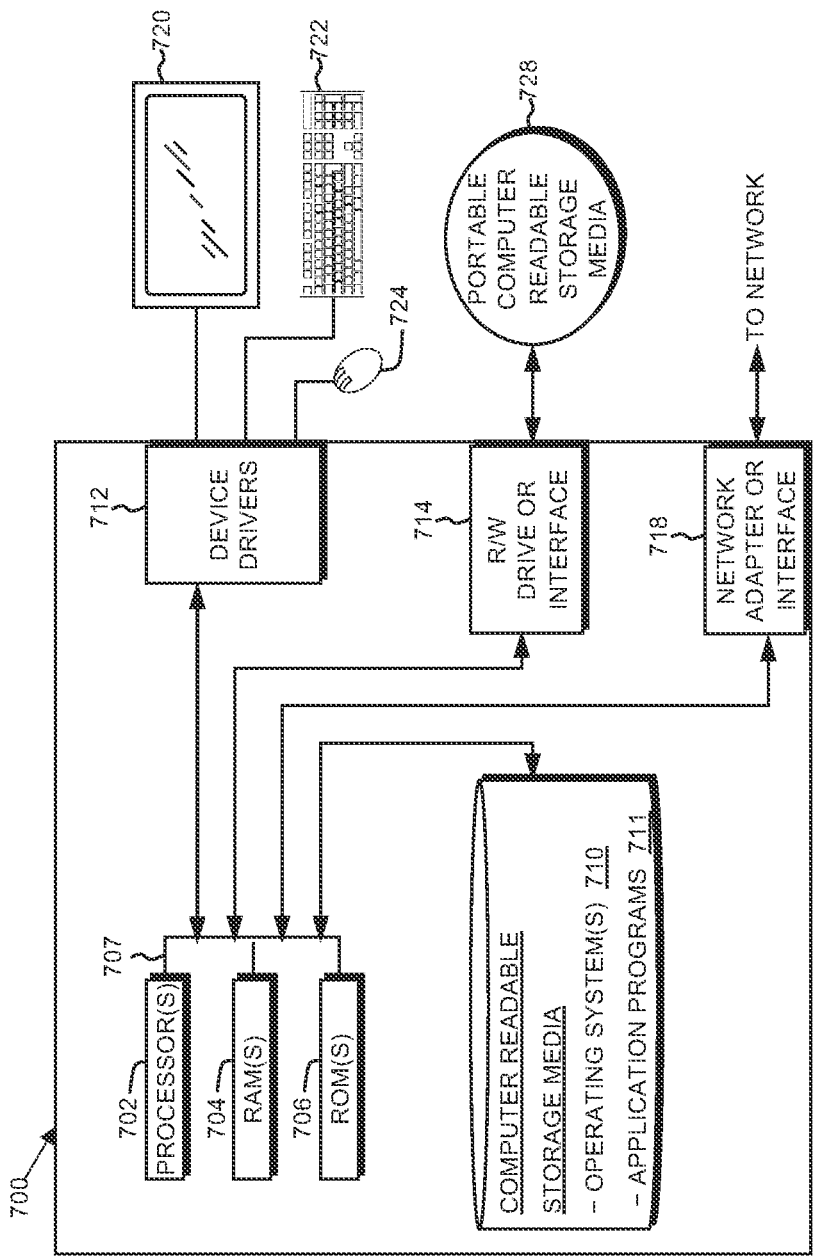
FIG. 7 depicts a block diagram illustrating components of the software application of FIG. 1, in accordance with an embodiment of the invention.

FIG. 7 is a block diagram of components 700 of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

FIG. 7 is a block diagram of components 700 of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Components 700 is representative of any electronic device capable of executing machine-readable program instructions. Components 700 may be representative of a smart phone, a computer system, PDA, or other electronic devices. Examples of computing systems, environments, and/or configurations that may represented by components 700 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices. The one or more servers may include respective sets of components illustrated in FIG. 7. Each of the sets of components include one or more processors 702, one or more computer-readable RAMs 704 and one or more computer-readable ROMs 706 on one or more buses 707, and one or more operating systems 710 and one or more computer-readable tangible storage devices if applicable. The one or more operating systems 710 may be stored on one or more computer-readable tangible storage devices for execution by one or more processors 702 via one or more RAMs 704 (which typically include cache memory). In the embodiment illustrated in FIG. 7, each of the computer-readable tangible storage devices is a magnetic disk storage device of an internal hard drive. Alternatively, each of the computer-readable tangible storage devices is a semiconductor storage device such as ROM 706, EPROM, flash memory or any other computer-readable tangible storage device that can store a computer program and digital information.

Each set of components 700 also includes a R/W drive or interface 714 to read from and write to one or more portable computer-readable tangible storage devices 728 such as a CD-ROM, DVD, memory stick, magnetic tape, magnetic disk, optical disk or semiconductor storage device. A software program can be stored on one or more of the respective portable computer-readable tangible storage devices 728, read via the respective R/W drive or interface 714 and loaded into the respective hard drive.

Each set of components 700 may also include network adapters (or switch port cards) or interfaces 718 such as a TCP/IP adapter cards, wireless wi-fi interface cards, or 3G or 4G wireless interface cards or other wired or wireless communication links. Applicable software can be downloaded from an external computer (e.g., server) via a network (for example, the Internet, a local area network or other, wide area network) and respective network adapters or interfaces 716. From the network adapters (or switch port adaptors) or interfaces 718, the centralized platform is loaded into the respective hard drive. The network may comprise copper wires, optical fibers, wireless transmission, routers, firewalls, switches, gateway computers and/or edge servers.

Each of components 700 can include a computer display monitor 720, a keyboard 722, and a computer mouse 724. Components 700 can also include touch screens, virtual keyboards, touch pads, pointing devices, and other human interface devices. Each of the sets of components 700 also includes device processors 702 to interface to computer display monitor 720, keyboard 722 and computer mouse 724. The device drivers 712, R/W drive or interface 714 and network adapter or interface 718 comprise hardware and software (stored in a storage device and/or ROM 706).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (Aasax): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
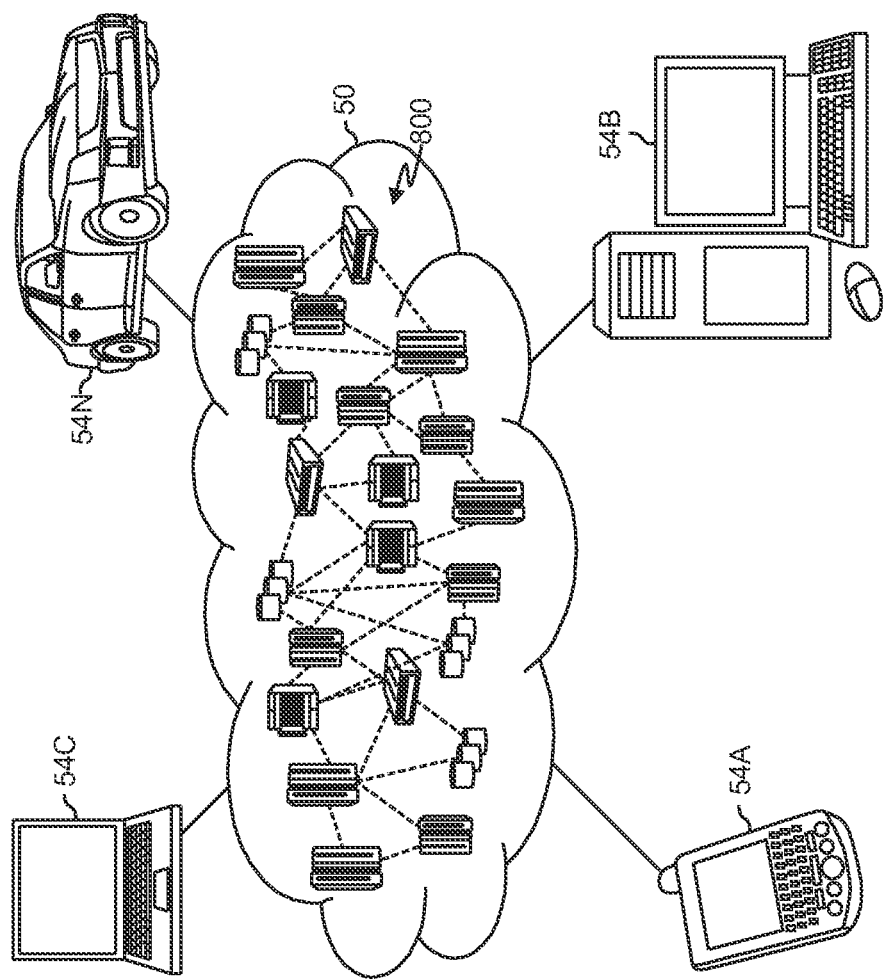
FIG. 8 depicts a cloud-computing environment, in accordance with an embodiment of the present invention.

Referring now to FIG. 8, illustrative cloud computing environment 800 is depicted. As shown, cloud computing environment 800 comprises one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 54A-N shown in FIG. 8 are intended to be illustrative only and that computing nodes 50 and cloud computing environment 800 can communicate with any type of computerized device over any type of network and/or network addressable connection (e.g., using a web browser).

Figure 9:
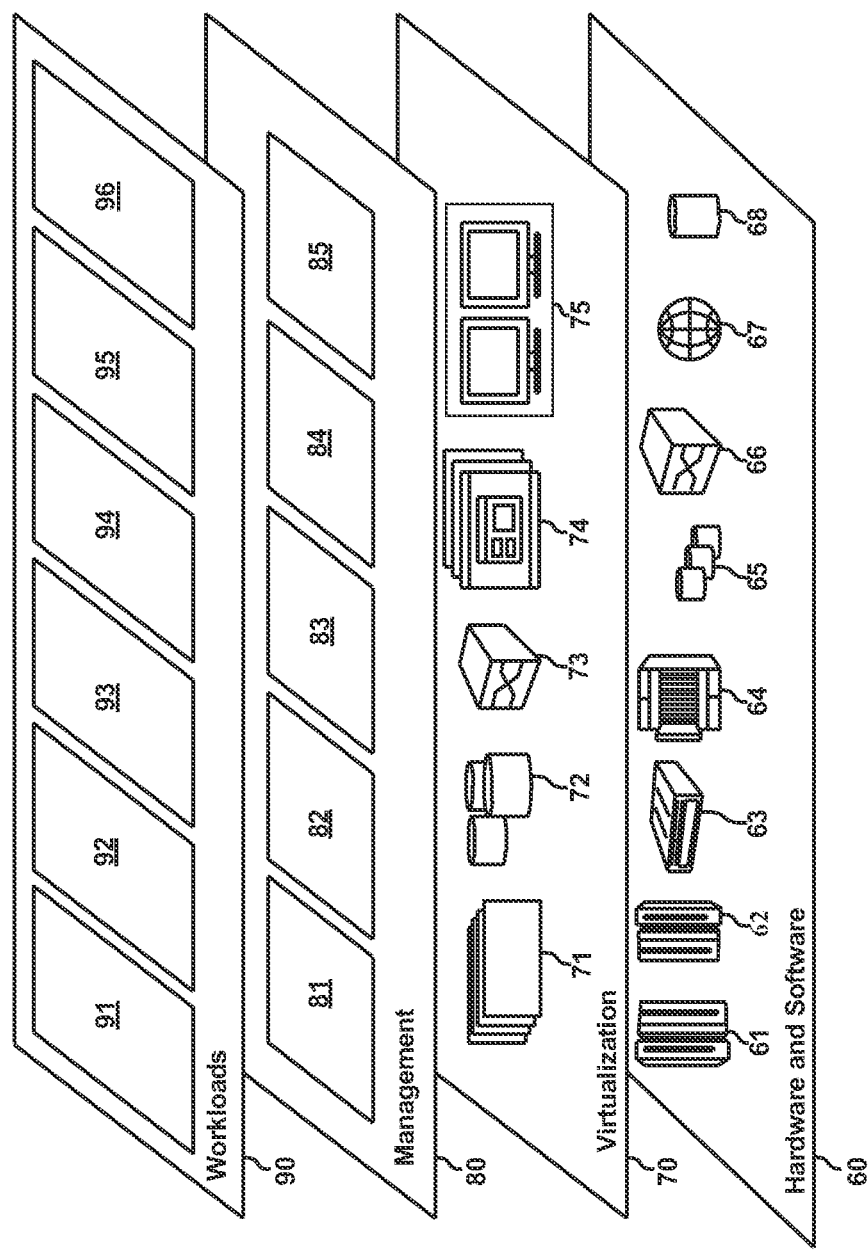
FIG. 9 depicts abstraction model layers, in accordance with an embodiment of the present invention.

Referring now to FIG. 9 a set of functional abstraction layers provided by cloud computing environment 800 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95, and multiparty discussion alert generation 96. Multiparty discussion alert generation 96 relates to generating alerts of relevant content within the multi-party discussion channels.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for generating relevance alerts comprising:
   analyzing, by a computing device, a multi-party discussion in multi-party discussion channels based on a generated profile associated with a user;
   assigning, by the computing device, at least one relevance value associated with the user to the multi-party discussion based on the analysis and an amount of multi-party discussion participation associated with the user;
   in response to determining that the relevance value exceeds a relevance threshold associated with the multi-party discussion, generating, by the computing device, an alert for the user to participate in the multi-party discussion;
   wherein the alert comprises a lead time associated with a time interval for the user to participate in the multi-party discussion based on a plurality of predictions; and
   clustering a plurality of media content associated with the user based on correlating the relevance threshold to the generated profile.

2. The computer-implemented method of claim 1, wherein analyzing the multi-party discussion comprises:
   monitoring, by the computing device, participant dialogue within the multi-party discussion;
   identifying, by the computing device, using natural language processing techniques at least one participant dialogue topic based on the participant dialogue; and
   comparing, by the computing device, at least one profile topic derived from the generated profile to the at least one participant dialogue topic.

3. The computer-implemented method of claim 2, wherein monitoring participant dialogue of the multi-party discussion comprises:
   recording, by the computing device, content of the multi-party discussion in an electronic format; and
   converting, by the computing device, the content into a text transcript.

4. The computer-implemented method of claim 3, further comprising:
   generating, by the computing device, at least one excerpt of relevant content derived from the transcript based upon the generated profile;
   wherein the at least one relevance value is assigned at a time interval of the transcript including the at least one excerpt.

5. The computer-implemented method of claim 1, wherein the relevance threshold is derived from the computing device analyzing a level of participation of the user in the participant dialogue of the current multi-party discussion.

6. The computer-implemented method of claim 5, wherein the level of participation is weighed based upon one or more of the generated profile, an activity pattern of the user, and a previous involvement of the user in the dialogue of the multi-party discussion.

7. The computer-implemented method of claim 1, wherein assigning the at least one relevance value comprises:
utilizing one or more machine learning algorithms to generate the plurality of predictions.

8. The computer-implemented method of claim 1, wherein the alert is one or more of an email, text message, push notification, push notification, sound notification, vibrate notification, and smart notification.

9. A computer system for generating relevance alerts, the computer system comprising:
one or more processors, one or more computer-readable memories, and program instructions stored on at least one of the one or more computer-readable memories for execution by at least one of the one or more processors to cause the computer system to:
program instructions to analyze a multi-party discussion based on a generated profile associated with a user;
program instructions to assign at least one relevance value associated with the user to the multi-party discussion based on the analysis and an amount of multi-party discussion participation associated with the user;
program instructions to generate an alert for the user to participate in the multi-party discussion in response to a determination that the relevance value exceeds a relevance threshold associated with the multi-party discussion;
wherein the alert comprises a lead time associated with a time interval for the user to participate in the multi-party discussion based on a plurality of predictions; and
program instructions to cluster a plurality of media content associated with the user based on correlating the relevance threshold to the generated profile.

10. The computer system of claim 9, wherein the program instructions to analyze the multi-party discussion comprise:
program instructions to monitor participant dialogue of the multi-party discussion;
program instructions to identify at least one participant dialogue topic based on the participant dialogue; and
program instructions to compare at least one profile topic derived from the generated profile to the at least one participant dialogue topic.

11. The computer system of claim 10, wherein the program instructions to monitor participant dialogue of the multi-party discussion comprise:
program instructions to record content of the multi-party discussion; and
program instructions to convert the content into a transcript.

12. The computer system of claim 11, wherein the program instructions to monitor participant dialogue of the multi-party discussion further comprise:
program instructions to generate at least one excerpt of relevant content derived from the transcript based upon the generated profile;
wherein the at least one relevance value is assigned at a time interval of the transcript including the at least one excerpt.

13. The computer system of claim 11, wherein the relevance threshold is derived from program instructions to analyze a level of participation of the user in the participant dialogue of the current multi-party discussion.

14. The computer system of claim 13, wherein the level of participation is weighed based upon one or more of the generated profile, an activity pattern of the user, and a previous involvement of the user in the dialogue of the multi-party discussion.

15. The computer system of claim 9, wherein the program instructions to assign the at least one relevance value comprises:
program instruction to utilize one or more machine learning algorithms to generate the plurality of predictions.

16. A computer program product for generating relevance alerts, the computer program product comprising a computer readable storage medium having program instructions embodied therewith, wherein the computer readable storage medium is not a transitory signal per se, the program instructions being executable by a processor to cause the processor to perform a method comprising:
analyzing a multi-party discussion based on a generated profile associated with a user;
assigning at least one relevance value associated with the user to the multi-party discussion based on the analysis and an amount of multi-party discussion participation associated with the user; and
in response to determining that the relevance value exceeds a relevance threshold associated with the multi-party discussion, generating an alert for the user to participate in the multi-party discussion;
wherein the alert comprises a lead time associated with a time interval for the user to participate in the multi-party discussion based on a plurality of predictions; and
clustering a plurality of media content associated with the user based on correlating the relevance threshold to the generated profile.

17. The computer program product of claim 16, wherein analyzing the multi-party discussion comprises:
monitoring participant dialogue of the multi-party discussion;
identifying at least one participant dialogue topic based on the participant dialogue; and
comparing at least one profile topic derived from the generated profile to the at least one participant dialogue topic.

18. The computer program product of claim 17, wherein monitoring participant dialogue of the multi-party discussion comprises:
recording content of the multi-party discussion; and
converting the content into a transcript.

19. The computer program product of claim 18, further comprising:
generating at least one excerpt of relevant content derived from the transcript based upon the generated profile;
wherein the at least one relevance value is assigned at a time interval of the transcript including the at least one excerpt.

20. The computer program product of claim 16, wherein the relevance threshold is derived from analyzing a level of participation of the user in the participant dialogue of the current multi-party discussion.

* * * * *